US012581513B2

(12) United States Patent　　(10) Patent No.:　US 12,581,513 B2
Guo et al.　　(45) Date of Patent: 　Mar. 17, 2026

(54) METHODS AND APPARATUS FOR RESOURCE SELECTION OF SIDELINK

(71) Applicant: Lenovo (Beijing) Ltd., Beijing (CN)

(72) Inventors: Xin Guo, Chaoyang District (CN); Xiaodong Yu, Haidian District (CN); Zhennian Sun, Chaoyang District (CN); Haipeng Lei, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 662 days.

(21) Appl. No.: 17/910,906

(22) PCT Filed: Mar. 20, 2020

(86) PCT No.: PCT/CN2020/080459
§ 371 (c)(1),
(2) Date: Sep. 12, 2022

(87) PCT Pub. No.: WO2021/184364
PCT Pub. Date: Sep. 23, 2021

(65) Prior Publication Data
US 2023/0164813 A1　　May 25, 2023

(51) Int. Cl.
| | |
|---|---|
| *H04W 72/40* | (2023.01) |
| *H04W 52/02* | (2009.01) |
| *H04W 72/02* | (2009.01) |
| *H04W 72/23* | (2023.01) |
| *H04W 72/56* | (2023.01) |
| *H04W 4/40* | (2018.01) |

(52) U.S. Cl.
CPC ....... *H04W 72/40* (2023.01); *H04W 52/0212* (2013.01); *H04W 72/02* (2013.01);
(Continued)

(58) Field of Classification Search
CPC . H04W 72/40; H04W 52/0212; H04W 72/23; H04W 72/56; H04W 72/02; H04W 4/40; Y02D 30/70
See application file for complete search history.

(56) References Cited

U.S. PATENT DOCUMENTS

| | | | |
|---|---|---|---|
| 12,192,959 B2 * | 1/2025 | Zhao | H04W 48/12 |
| 2020/0195414 A1 * | 6/2020 | Nguyen | H04L 5/1469 |

(Continued)

FOREIGN PATENT DOCUMENTS

| | | | |
|---|---|---|---|
| CN | 108260082 A | 7/2018 | |
| CN | 108271253 A * | 7/2018 | ........ H04W 72/0493 |

(Continued)

OTHER PUBLICATIONS

English Translation of CN-108271253-A, 2018, retrived from PE2E Search on Mar. 22, 2025 (Year: 2018).*

(Continued)

*Primary Examiner* — Omar J Ghowrwal
(74) *Attorney, Agent, or Firm* — FIG. 1 Patents

(57)　　ABSTRACT
Embodiments of the present application relate to a method and an apparatus for resource selection on NR sidelink. According to an embodiment of the present application, a method can include: receiving resource selection controlling information; and determining one or more candidate resources in a resource selection window of a resource pool for a physical sidelink control channel (PSCCH) transmission and/or a physical sidelink shared channel (PSSCH) transmission based on the resource selection controlling information. Embodiments of the present application can save power for VRUs as well as decrease resource collision between the traffics affected by the resource selection controlling information.

20 Claims, 9 Drawing Sheets

(52) U.S. Cl.
CPC .......... *H04W 72/23* (2023.01); *H04W 72/56*
(2023.01); *H04W 4/40* (2018.02); *Y02D 30/70*
(2020.08)

(56) References Cited

U.S. PATENT DOCUMENTS

| | | | | |
|---|---|---|---|---|
| 2020/0296690 A1* | 9/2020 | Lee | ......................... | H04W 4/40 |
| 2021/0219268 A1* | 7/2021 | Li | ........................ | H04B 17/318 |
| 2022/0201655 A1* | 6/2022 | Kang | .................. | H04W 72/563 |

FOREIGN PATENT DOCUMENTS

| | | | |
|---|---|---|---|
| CN | 110120844 | A | 8/2019 |
| WO | 2018169113 | A1 | 9/2018 |
| WO | 2020033088 | A1 | 2/2020 |

OTHER PUBLICATIONS

Fujitsu , "Resource Allocation for NR V2X Sidelink Communication", 3GPP TSG RAN WG1 Meeting #95, R1-1812410, Spokane, United States [retrieved Aug. 19, 2022]. Retrieved from the internet <https://www.3gpp.org/ftp/TSG_RAN/WG1_RL1/TSGR1_95/Docs/>., Nov. 2018, 9 Pages.

Huawei , et al., "Sidelink resource allocation mode 2", 3GPP TSG RAN WG1 Meeting #95, R1-1812209, Spokane, USA [retrieved Aug. 19, 2022]. Retrieved from the internet <https://www.3gpp.org/ftp/tsg_ran/wg1_rl1/TSGR1_95/Docs/>., Nov. 2018, 14 Pages.

PCT/CN2020/080459 , "International Preliminary Report on Patentability", PCT Application No. PCT/CN2020/080459, Sep. 29, 2022, 5 pages.

PCT/CN2020/080459 , "International Search Report and Written Opinion", PCT Application No. PCT/CN2020/080459, Dec. 21, 2020, 7 pages.

* cited by examiner

502 receiving resource selection
controlling information

504 determining one or more candidate
resources generating resource selection
controlling information    702 transmitting resource selection
controlling information    704

800

900

METHODS AND APPARATUS FOR RESOURCE SELECTION OF SIDELINK

TECHNICAL FIELD

Embodiments of the present application generally relate to wireless communication technology, especially to a method and an apparatus for resource selection for 3GPP (3rd Generation Partnership Project) 5G new radio (NR) sidelink (SL).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between UEs in proximity, and data does not need to go through a base station (BS) or a core network.

In 3GPP Release 16, NR sidelink is designed based on an assumption of "always-on" when UE operates on a sidelink, for example, only focusing on UEs installed in vehicles with sufficient battery capacity. Solutions for power saving in 3GPP Release 17 are required for vulnerable road users (VRUs) in V2X use cases and for UEs in public safety and commercial use cases where power consumption in the UEs needs to be minimized. However, details regarding such solutions have not been discussed in 3GPP 5G NR technology yet.

Therefore, the industry desires an improved technology for resource selection on NR sidelink so as to save power of the VRU.

SUMMARY

Some embodiments of the present application provide a technical solution for resource selection on NR sidelink.

According to some embodiments of the present application, a method may include: receiving resource selection controlling information; and determining one or more candidate resources in a resource selection window of a resource pool for a physical sidelink control channel (PSCCH) transmission and/or a physical sidelink shared channel (PSSCH) transmission based on the resource selection controlling information.

In an embodiment of the present application, the resource selection controlling information may indicate at least one resource selection probability, wherein each of the at least one resource selection probability is associated with at least one of: a traffic type, a traffic priority, a transmission type, a resource selection method, and a resource.

In another embodiment of the present application, the resource selection controlling information may indicate a resource selection sequence for a group of resources, wherein the resource selection sequence is associated with at least one of: a traffic type, a traffic priority, a transmission type, and a resource selection method.

In yet another embodiment of the present application, the method may further include: transmitting an indication indicating the one or more candidate resources for the PSCCH and/or the PSSCH transmission, a resource selection method, and a traffic priority when triggering a resource selection or a resource reselection in a time instance.

In yet another embodiment of the present application, the method may further include: receiving an indication from another UE, wherein the indication indicating a set of candidate resources for a PSCCH transmission and/or a PSSCH transmission, a resource selection method, and a traffic priority of another UE.

According to some other embodiments of the present application, a method may include: generating resource selection controlling information for a user equipment (UE), wherein the resource selection controlling information is used for the UE to determine one or more candidate resources in a resource selection window of a resource pool for a PSCCH transmission and/or a PSSCH transmission; and transmitting the resource selection controlling information to the UE.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for resource selection on NR sidelink. Accordingly, embodiments of the present application can save power for VRUs as well as decrease resource collision between the traffics affected by the resource selection controlling information.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
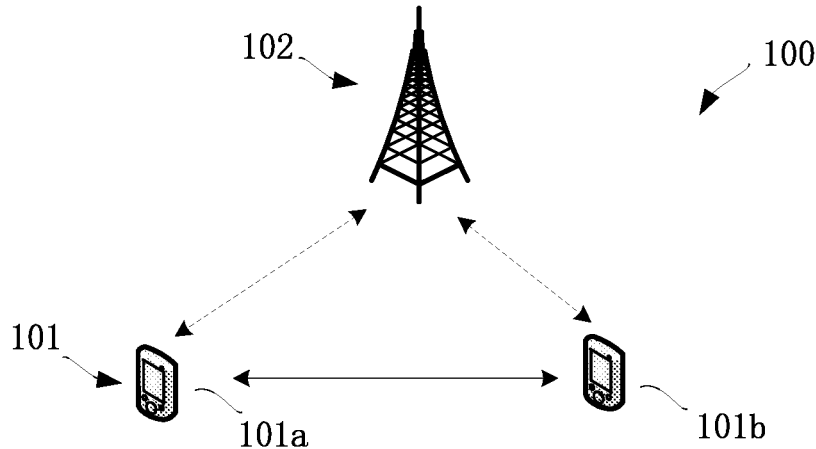
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

In some embodiments of the present application, the UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some other embodiments of the present application, the UE(s) 101 may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art. In an embodiment of the present application, the UE(s) 101 may be a pedestrian UE (P-UE), a cyclist UE, a vehicle UE (V-UE), or the like.

According to some embodiments of FIG. 1, UE 101a functions as Tx UE, and UE 101b functions as Rx UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 101a may transmit data to UE 101b and other UEs (not shown in FIG. 1) by a sidelink broadcast transmission session.

Alternatively, according to some other embodiments of FIG. 1, UE 101b functions as Tx UE and transmits V2X messages, UE 101a functions as Rx UE and receives the V2X messages from UE 101b.

Both UE 101a and UE 101b in the embodiments of FIG. 1 may transmit information to BS 102 and receive control information from BS 102, for example, via LTE or NR Uu interface. The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, wireless broadband technologies such as Worldwide Interoperability for Microwave Access (WiMAX®), among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

In 3GPP standard document TS36.300 [2], the design related to partial sensing for UE (e.g., P-UE) is as follows. Resource pool for transmission of UE (e.g., P-UE) may be overlapped with resources for V2X sidelink communication. For each transmission pool, a resource selection mechanism (i.e., a random selection procedure, or a partial sensing based selection mechanism), which is allowed to be used in this transmission pool, is also configured.

A partial sensing based selection mechanism may also be named as a partial sensing based resource selection mechanism, a partial sensing mechanism, a partial sensing procedure, or the like. If a UE (e.g., P-UE) is configured to use either a random selection mechanism or a partial sensing based selection mechanism for one transmission pool, it is up to implementations of the UE to select a specific resource selection mechanism.

If a UE (e.g., a P-UE) is configured to use a partial sensing based selection mechanism only, the UE shall use the partial sensing based selection mechanism in the pool. The UE shall not do a random selection mechanism in the pool, since only a partial sensing operation is allowed. If a BS does not provide a random selection pool, the UE that supports only a random selection mechanism cannot perform sidelink transmission. In exceptional pool, the UE uses a random selection mechanism. The UE can send sidelink UE information message to indicate that it requests resource pools for a pedestrian to everything (P2X) related sidelink communication transmission, as specified in 3GPP standard document TS36.331 [3].

According to 3GPP standard document TS36.213 [4], if UE (e.g., P-UE) is configured to use a partial sensing based selection mechanism, the UE will monitor the resource only in a subset of subframes. Compared with a random selection mechanism, a partial sensing based selection mechanism can reduce resource collision probability. Compared with a full sensing based selection mechanism, a partial sensing based selection mechanism can achieve power saving to a certain extent.

When a UE (e.g., UE 101a or UE 101b illustrated and shown in FIG. 1) performs a partial sensing based selection mechanism or a partial sensing based reselection mechanism, the UE should have sensed on a sensing window with all allowed resource reservation periodicities configured by a higher layer (e.g., MAC layer or a layer higher than the MAC layer) before using sensing result(s) for resource reselection mechanism. The UE may not know when the resource selection or reselection procedure will be performed, and thus, a sensing window for the UE should be periodical. Without loss of generality, if the first time unit (such as, a subframe in time and frequency domains) of a partial sensing window is as a start point of a partial sensing cycle, distributions of the partial sensing window in time domain can be shown in FIG. 2.

Figure 2:
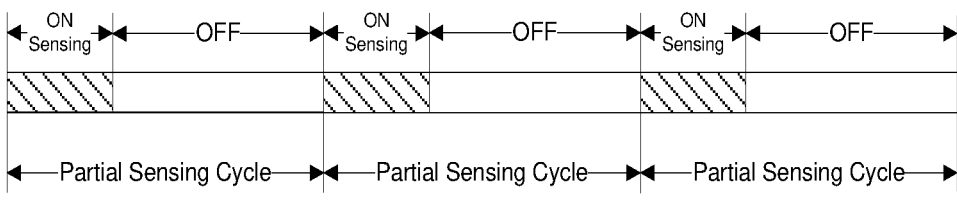
FIG. 2 illustrates an exemplary distribution of a partial sensing window in the time domain in accordance with some embodiments of the present application.

FIG. 2 illustrates an exemplary distribution of a partial sensing window in the time domain in accordance with some embodiments of the present application.

As can be seen, in the embodiments of FIG. 2, there are three partial sensing cycles in a partial sensing window, and each partial sensing cycle (e.g., Partial Sensing Cycle as shown in FIG. 2) includes ON Sensing duration (e.g., ON Sensing as shown in FIG. 2) and OFF duration (e.g., OFF as shown in FIG. 2).

It can be contemplated that in some other embodiments of the present application, there may be more or less multiple partial sensing cycles in a partial sensing window.

ON Sensing duration of a partial sensing cycle may also be named as On Sensing Duration for Partial Sensing, Sensing Active Time of a partial sensing cycle, Sensing Active Time for Partial Sensing, or the like. OFF duration of a partial sensing cycle may also be named as Off Sensing Duration for Partial Sensing, Sensing Inactive Time of a partial sensing cycle, Sensing Inactive Time for Partial Sensing, or the like.

The sensing results obtained in the partial sensing window may be used for determining one or more candidate resources for a PSCCH transmission and/or a PSSCH transmission in a resource selection window. For example, FIG. 3 illustrates an exemplary partial sensing based selection mechanism in accordance with some embodiments of the present application.

Figure 3:
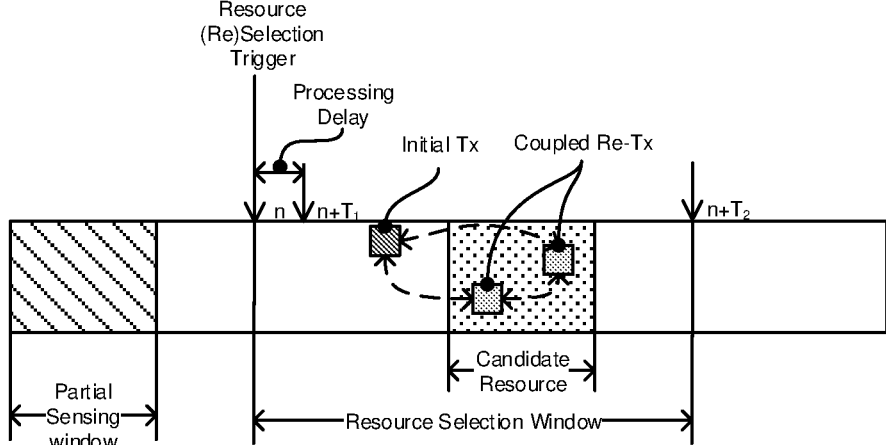
FIG. 3 illustrates an exemplary partial sensing based selection mechanism in accordance with some embodiments of the present application.

As shown in FIG. 3, if the UE 101a (for example, a P-UE) is configured with partial sensing based selection mechanism, the UE 101a may sense on a partial sensing window with all allowed resource reservation periodicities configured by a higher layer. After that, at a time instance n, the resource selection (or reselection) may be triggered, then the UE 101a may determine one or more candidate resources for a PSCCH transmission and/or a PSSCH transmission based on the sensing results obtained from the partial sensing window in a resource selection window between n and n+T2, wherein T2 is a time period larger than 0. For example, the range of value and determination method for T2 may be determined as specified in 3GPP standard document.

Although the resource selection (or reselection) may be triggered at the time instance n, the UE 101a may not determine the one or more candidate resources at the time instance n because there is a processing delay for the UE 101a. Referring to FIG. 3, T1 may be a time period indicating a processing delay of the UE 101a. T1 may be larger than or equal to 0. For example, the range of value and determination method for T1 may be determined as specified in 3GPP standard document.

As shown in FIG. 3, in the resource selection window of the UE 101a, another UE 101b (for example, a V-UE) may transmit an aperiodic transmission. The aperiodic transmission may include an initial transmission (for example, initial Tx as shown in FIG. 3) coupled with two retransmissions (for example, coupled Re-Tx as shown in FIG. 3). Since the transmission pattern of the aperiodic transmission is not predictable, it may not be sensed by the UE 101a. Therefore, it is very likely for the aperiodic transmission to collide with candidate resource determined based on partial sensing mechanism for P2X related sidelink communication.

Figure 4:
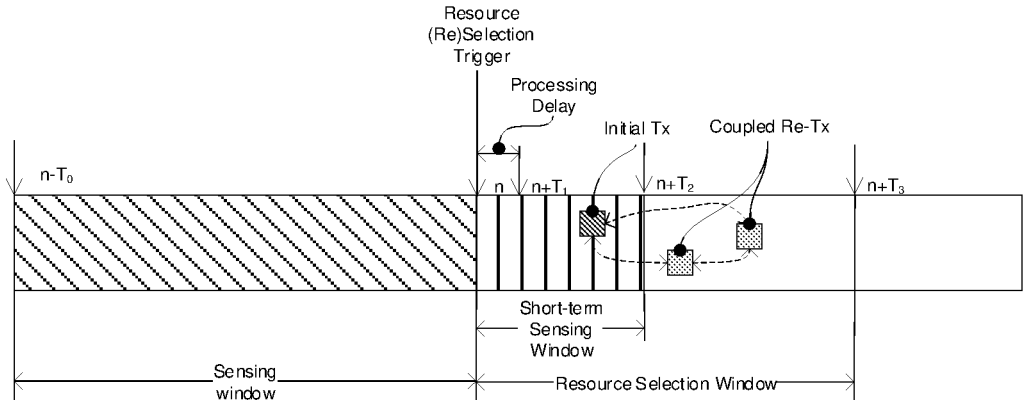
FIG. 4 illustrates an exemplary re-evaluation method in accordance with some embodiments of the present application.

To solve the above problem, FIG. 4 illustrates an exemplary re-evaluation method in accordance with some embodiments of the present application.

As shown in FIG. 4, if the UE 101a (for example, a V-UE) is configured with sensing based selection mechanism, the UE 101a may sense on a sensing window between n and n−T0 configured by a higher layer, wherein T0 is a time period larger than 0. After that, at a time instance n, the resource selection (or reselection) may be triggered. The UE 101a may determine one or more candidate resources for a PSCCH transmission and/or a PSSCH transmission in a resource selection window between n and n+T3, wherein T3 is a time period larger than 0. For example, the range of value and determination method for T0 and T3 may be determined as specified in 3GPP standard document.

To avoid that the selected resource collides with that of the aperiodic transmission, a short-term sensing window between n and n+T2 is introduced in the resource selection window between n and n+T3, wherein T2 is a time period larger than 0. For example, the range of value and determination method for T2 may be determined as specified in 3GPP standard document. Once an aperiodic transmission, such as initial transmission (for example, initial Tx as shown in FIG. 4), is identified within the short-term sensing window, the UE 101*a* shall exclude any resource indicated by sidelink control information (SCI) in the identified transmission and/or any resource indicated by the SCI for the retransmissions (for example, coupled Re-Tx as shown in FIG. 4) coupled with the identified transmission from the recourse selection window between n and n+T3.

That is, the one or more candidate resources for the PSCCH transmission and/or the PSSCH transmission in a resource selection window between n and n+T3 may be determined based on the sensing results in the sensing window between n and n−T0 and the short-term sensing window between n and n+T2.

Similar as FIG. 3, T1 in FIG. 4 may be a time period indicating a processing delay of the UE 101*a*. T1 may be larger than or equal to 0. For example, the range of value and determination method for T1 may be determined as specified in 3GPP standard document.

The above re-evaluation method illustrated in FIG. 4 may be efficiently for a V-UE to avoid collision with aperiodic traffic. However, if the re-evaluation method is introduced to a P-UE for addressing the impact caused by aperiodic traffic, the burden of sensing will be increased for the P-UE. On one hand, the added short-term sensing window for the P-UE may result in an extended sensing duration. On the other hand, since the P-UE can only select resource from a restricted range of candidate resources, the range of candidate resources will have to be enlarged to provide enough candidate resources required by P-UE to ease the resource competition between P2X traffics and potential aperiodic traffics. Meanwhile, the partial sensing window associated with the candidate resource should be enlarged accordingly. As a result, the time duration for sensing will be increased for P-UE, which goes against the intention of power saving by utilizing partial sensing. Therefore, the method of re-evaluation is not suitable for a P-UE which relies on partial sensing based resource selection aiming at power saving.

Given the above, embodiments of the present application aim to provide solutions for resource selection for NR sidelink. Accordingly, embodiments of the present application can save power for VRUs as well as decrease resource collision with aperiodic traffic. More details on embodiments of the present application will be illustrated in the following text in combination with the appended drawings.

Figure 5:
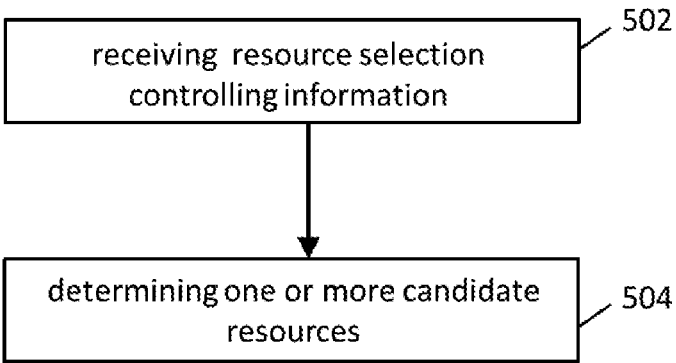
FIG. 5 illustrates a flow chart of a method for resource selection on NR sidelink in accordance with some embodiments of the present application.

FIG. 5 is a flow chart illustrating a method for resource selection on NR sidelink according to some embodiments of the present application. The method may be performed by a UE 101 (for example, UE 101*a* or UE 101*b*) as shown in FIG. 1.

As shown in FIG. 5, in step 502, the UE 101 may receive resource selection controlling information. The resource selection controlling information may be received from a base station (for example, the base station 102 as shown in FIG. 1) or from another UE.

According to some embodiments of the present application, the resource selection controlling information may indicate at least one resource selection probability, wherein each of the at least one resource selection probability is associated with at least one of: a traffic type, a traffic priority, a transmission type, a resource selection method, and a resource. For example, the resource selection probability may be represented by prob(trafficType, priority, transmission Type, resourceSelectionMethod, resource). The value of each resource selection probability may be set within a range between 0 and 1. The resource selection probability may represent that the resource can be selected and reserved for the traffic with probability (1-prob). The value of resource selection probability for a certain traffic can be determined by the BS. In an embodiment of the present application, the determination of value for the resource selection probability is up to the implementation of the BS.

According to some other embodiments of the present application, the resource selection controlling information may indicate a resource selection sequence for a group of resources, wherein the resource selection sequence is associated with at least one of: a traffic type, a traffic priority, a transmission type, and a resource selection method. In an embodiment of the present application, the resource selection sequence may include an ordered sequence of indices, wherein each index corresponds to a resource of the group of resources. The ordered sequence of indices corresponding to the group of resources may represent that the group of resources for the traffic should be selected according to the order of the sequence. The correlation between indices and the group of resources can be determined the BS. In an embodiment of the present application, the determination of correlation between indices and the group of resources is up to the implementation of the BS.

The traffic type may be one of: a periodic traffic type, an aperiodic traffic type, a P2X traffic type, and a V2X traffic type. The traffic priority may be one of: a ProSe Per-Packet Priority (PPPP) defined in long term evolution (LTE) sidelink or a priority defined in PC5 5G quality of service (QoS) Identifier (PQI). The transmission type may be one of an initial transmission type and a retransmission type. The resource selection method may be one of: a sensing-based resource selection method, a partial sensing-based resource selection method, a random selection method, a method of base station scheduling the resource, and a method of other UE scheduling the resource. The resource may include at least one of: one or more single-subframe resources; one or more subframes; and one or more sets of subframes.

According to some other embodiments of the present application, the resource selection controlling information may indicate the UE 101 to transmit an indication indicating the one or more candidate resources for the PSCCH transmission and/or the PSSCH transmission, a resource selection method, and a traffic priority when triggering a resource selection in a time instance.

According to some other embodiments of the present application, the resource selection controlling information may indicate the UE 101 to receive an indication in the from another UE, wherein the indication indicating a set of candidate resources for PSCCH and/or PSSCH transmission, a resource selection method, and a traffic priority of another UE. In an embodiment of the present application, in addition to indicating the UE 101 to receive the indication-from another UE, the resource selection controlling information may also indicate at least one resource selection probability or a resource selection sequence for a group of resources as stated above.

According to some embodiments of the present application, the resource selection controlling information may be transmitted by system information, a radio resource control (RRC) signalling, a medium access control (MAC) control element (CE), or a physical layer signalling. The system information may include at least one of: a master information block (MIB) and a system information block (SIB). In the case that the resource selection controlling information is transmitted by a physical layer signalling, if the resource selection controlling information is transmitted from a BS 102, the physical layer signalling may be downlink control information (DCI). In the case that the resource selection controlling information is transmitted by a physical layer signalling, if the resource selection controlling information is transmitted from another UE, the physical layer signalling may be SCI signalling.

According to some embodiments of the present application, the resource selection controlling information may be associated with a resource pool configuration. For example, the resource selection controlling information may be included in resource selection configuration information (e.g., resourceSelectionConfigP2X or resourceSelectionConfigV2X as defined in TS 36.331) for configuring the resource pool for the UE 101.

According to some embodiments of the present application, the resource selection controlling information may be associated with a zone configuration. For example, the resource selection controlling information may be included in zone configuration information as specified in 3GPP standard document.

According to some embodiments of the present application, the resource selection controlling information may be pre-configured in such as the resource pool configuration information or zone configuration information for the UE.

After receiving the resource selection controlling information, at step 504, the UE 101 may determine one or more candidate resources in a resource selection window of a resource pool for a PSCCH transmission and/or a PSSCH transmission based on the resource selection controlling information. The resource selection window may be defined as illustrated in FIG. 2 or FIG. 3.

According to some embodiments of the present application, the UE 101 may be configured to transmit P2X related sidelink communication. In the case that the UE 101 determines a lower layer (e.g., a physical layer) to transmit the PSCCH transmission and/or PSSCH transmission based on partial sensing based selection mechanism and the resource selection controlling is included in the resource selection configuration information (e.g., resourceSelectionConfigP2X as defined in TS 36.331), the UE 101 may configure the lower layer to determine the candidate resource(s) from the resource pool for transmitting the PSCCH transmission and/or PSSCH transmission (e.g., sidelink control information and the corresponding data) based on partial sensing based selection mechanism together with resource selection controlling information.

According to some other embodiments of the present application, the UE 101 may be configured to transmit V2X related sidelink communication. In the case that the UE 101 determines a lower layer (e.g., physical layer) to transmit the PSCCH transmission and/or PSSCH transmission based on the resource pool and the resource selection controlling is included in the resource selection configuration information (e.g., resourceSelectionConfigV2X as defined in TS 36.331), the UE 101 may configure the lower layer to determine the candidate resource(s) from the resource pool for transmitting the PSCCH transmission and/or PSSCH transmission (e.g., sidelink control information and the corresponding data) based on the resource selection controlling information.

According to some other embodiments of the present application, in the case that the resource selection controlling information is associated with zone configuration, the UE 101 may determine the candidate resource(s) in the context of zone based resource selection for transmitting the PSCCH transmission and/or PSSCH transmission (e.g., sidelink control information and the corresponding data) based on the resource selection controlling information.

In an embodiment of the present application, in the case that the resource selection controlling information indicates at least one resource selection probability, after receiving the selection controlling information, in addition to performing partial sensing based selection mechanism or sensing based selection mechanism to determine candidate resource(s) for transmitting the PSCCH transmission and/or PSSCH transmission, the UE 101 may also use the at least one resource selection probability to determine the candidate resource(s) for transmitting the PSCCH transmission and/or PSSCH transmission. For example, after receiving the at least one resource selection probability, for each resource, the UE 101 may generate a random probability value between 0 and 1, in the case that the random probability value is larger than or equal to a value of the resource selection probability associated with the resource, the UE 101 may include the resource in the one or more candidate resources, in the case that the random probability value is less than the value of the resource selection probability, the UE 101 may exclude the resource from the one or more candidate resources. The random probability value may be generated based on the random number generator.

In another embodiment of the present application, in the case that the resource selection controlling information indicates a resource selection sequence for a group of resources, after receiving the selection controlling information, in addition to performing partial sensing based selection mechanism or sensing based selection mechanism to determine candidate resource(s) for transmitting the PSCCH transmission and/or PSSCH transmission, the UE 101 may also use the resource selection sequence for a group of resources to determine the candidate resource(s) for transmitting the PSCCH transmission and/or PSSCH transmission. For example, after receiving the resource selection sequence for a group of resources, the UE 101 may order the one or more candidate resources according to the resource selection sequence, and then select resource for the PSCCH transmission and/or PSSCH transmission according to the ordered one or more candidate resources.

In yet another embodiment of the present application, after receiving the resource selection controlling information, the UE 101 may transmit an indication indicating the one or more candidate resources for the PSCCH transmission and/or PSSCH transmission, a resource selection method, and a traffic priority when triggering a resource selection in a time instance. The indication may be transmitted to one or more other UEs via a broadcast manner, a groupcast manner, or a unicast manner. According to an embodiment of the present application, the one or more candidate resources for the PSCCH transmission and/or PSSCH transmission of the UE 101 may be determined based on partial sensing based selection as shown in FIG. 2. According to another embodiment of the present application, the one or more candidate resources for the PSCCH transmission and/or PSSCH transmission of the UE 101 may be determined based on partial sensing based selection together with the resource selection controlling information as stated above. According to an embodiment of the present application, the indication may be transmitted in SCI, or the MAC CE, or a RRC signalling. According to an embodiment of the present application, the indication may be transmitted in a frequency resource which is randomly selected in the resource pool or within a dedicated set of resources assigned by a base station or pre-configured in such as the resource pool configuration information or zone configuration information for the UE.

In yet another embodiment of the present application, after receiving the resource selection controlling information, the UE 101 may receive an indication from another UE, wherein the indication may indicate a set of candidate resources for PSCCH and/or PSSCH transmission, a resource selection method, and a traffic priority of another UE. In an embodiment of the present application, the indication may be received in a partial sensing window, a sensing window, or a resource selection window of the UE 101. In another embodiment of the present application, the indication may be received in a partial sensing window, a sensing window, or a resource selection window of another UE. In yet another embodiment of the present application, one of the partial sensing window, the sensing window, or the resource selection window of the UE 101 may overlap one of the partial sensing window, the sensing window, or the resource selection window of another UE. In this case, the indication may be received in the overlapped portion of the windows.

According to an embodiment of the present application, in the case that the resource selection method of another UE is a partial sensing based resource selection, the UE 101 may compare the traffic priority of another UE with a traffic priority of the UE 101, in the case that the traffic priority of another UE is higher than the traffic priority of the UE, decreasing a selection opportunity for the one or more candidate resource indicated in the indication.

According to another embodiment of the present application, after receiving the indication from another UE, the UE 101 may use the resource selection controlling information associated with the set of candidate resources to determine the one or more candidate resources. For example, in the case that the set of candidate resources of another UE is included in the determined candidate resource(s) of the UE 101, the UE 101 may use the resource selection controlling information (e.g., at least one resource selection probability or a resource selection sequence for a group of resources) in the set of candidate resources to determine the final one or more candidate resources of UE 101. For the other candidate resources of the UE 101 not including the the set of candidate resources, the UE 101 may not use the resource selection controlling information on these candidate resources.

Figure 6:
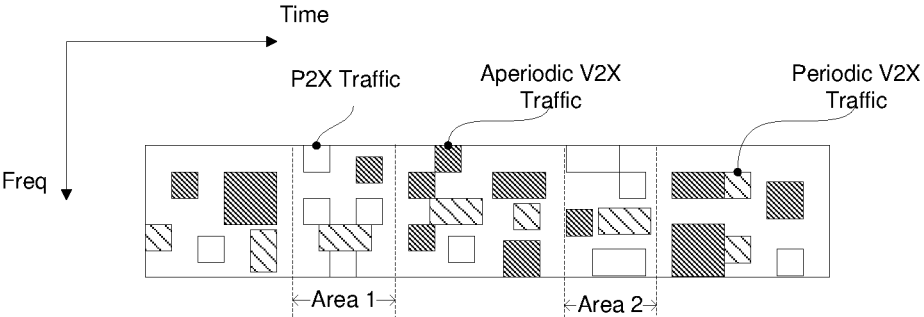
FIG. 6 illustrates an exemplary traffic distribution diagram in accordance with some embodiments of the present application.

The technical effect of embodiments of the present application can be described with an exemplary traffic distribution diagram after applying this method, which illustrated in FIG. 6. Referring to FIG. 6, it shows the traffic distributions of three kinds of traffic, i.e., P2X traffic, aperiodic V2X traffic, and periodic V2X traffic. As shown in FIG. 6, embodiments of the present application make P2X traffics to be concentrated in given area(s), such as Area-1 and Area-2, and thus decreasing the possible collision with aperiodic traffics. The reason is that, partial sensing based resource selection was designed for Rel-14 P-UE to deal with coexistence with periodic V2X traffics while guaranteeing power saving. However, the limited partial sensing window does not allow P-UE to efficiently identify aperiodic traffics (introduced in Rel-16) whose transmission pattern is not predictable, whereas embodiments of the present application enables resources in a certain area (for example, Area-1 or Area-2) to be collectively selected for a certain type of traffic (for example, P2X traffic) by assigning a probability or priority to the resources of the area.

In addition, embodiments of the present application also have the other advantages. For example, embodiments of the present application have a flexible configuration considering both the traffic type and QoS, and thus are adapt to variation of services and design targets. For example, to decrease possible impact on time-sensitive aperiodic traffics, i.e. guaranteeing latency requirement of the aperiodic traffics, embodiments of the present application can be implemented as follows: slot restriction is applied to aperiodic traffic with non-urgent latency requirement; and multiple narrow areas (like Area-1 and Area-2) is set in the time domain, instead of setting one broad area.

On the other hand, in embodiments of the present application, the resource selection restriction is done by setting resource selection probability, instead of precluding a certain traffic to be accommodated in target area(s). That is to say, the restricted traffics still have opportunity to use the resource in target area(s), only with low priority. In that case, even if there are a lot of aperiodic traffics and few P2X traffics within a certain time duration, not only QoS of traffics but also spectrum efficiency of system can be guaranteed.

Figure 7:
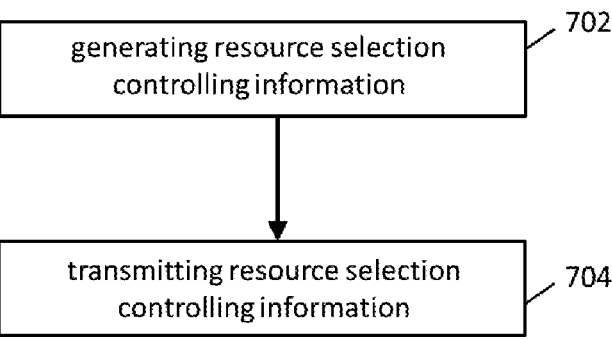
FIG. 7 illustrates a flow chart of a method for resource selection on NR sidelink in accordance with some other embodiments of the present application.

FIG. 7 is a flow chart illustrating a method for resource selection on NR sidelink according to some embodiments of the present application. The method may be performed by a BS 102 as shown in FIG. 1.

As shown in FIG. 7, in step 702, the BS 101 may generate resource selection controlling information for a UE 101 (for example, the UE 101a or UE 101b as shown in FIG. 1). The resource selection controlling information may be used for the UE 101 to determine one or more candidate resources in a resource selection window of a resource pool for a PSCCH transmission and/or a PSSCH transmission.

According to some embodiments of the present application, the resource selection controlling information may indicate at least one resource selection probability, wherein each of the at least one resource selection probability is associated with at least one of: a traffic type, a traffic priority, a transmission type, a resource selection method, and a resource. The value of each resource selection probability may be set within a range between 0 and 1. The value of resource selection probability for a certain traffic can be determined by the BS. In an embodiment of the present application, the determination of value for the resource selection probability is up to the implementation of the BS.

According to some other embodiments of the present application, the resource selection controlling information may indicate a resource selection sequence for a group of resources, wherein the resource selection sequence is associated with at least one of: a traffic type, a traffic priority, a transmission type, and a resource selection method. In an embodiment of the present application, the resource selection sequence may include an ordered sequence of indices, wherein each index corresponds to a resource of the group of resources. The ordered sequence of indices corresponding to the group of resources may represent that the group of resources for the traffic should be selected according to the order of the sequence. The correlation between indices and the group of resources can be determined the BS. In an embodiment of the present application, the determination of correlation between indices and the group of resources is up to the implementation of the BS.

The traffic type may be one of: a periodic traffic type, an aperiodic traffic type, a pedestrian to everything (P2X) traffic type, and a vehicle to everything (V2X) traffic type. The traffic priority may be one of: a ProSe Per-Packet Priority (PPPP) defined in long term evolution (LTE) sidelink or a priority defined in PC5 5G quality of service (QoS) Identifier (PQI). The transmission type may be one of an initial transmission type and a retransmission type. The resource selection method may be one of: a sensing-based resource selection method, a partial sensing-based resource selection method, a random selection method, a method of base station scheduling the resource, and a method of other UE scheduling the resource. The resource may include at least one of: one or more single-subframe resources; one or more subframes; and one or more sets of subframes.

According to some other embodiments of the present application, the resource selection controlling information may indicate the UE 101 to transmit an indication indicating the one or more candidate resources for the PSCCH transmission and/or the PSSCH transmission, a resource selection method, and a traffic priority when triggering a resource selection in a time instance (for example, a time instance n in FIG. 2 of FIG. 3).

According to some other embodiments of the present application, the resource selection controlling information may indicate the UE 101 to receive an indication from another UE, wherein the indication indicating a set of candidate resources for a PSCCH transmission and/or a PSSCH transmission, a resource selection method, and a traffic priority of another UE. In an embodiment of the present application, in addition to indicating the UE 101 to receive the indication in the resource selection window from another UE, the resource selection controlling information may also indicate at least one resource selection probability or a resource selection sequence for a group of resources as stated above.

After generating the resource selection controlling information, in step 704, the BS 102 may transmit the resource selection controlling information to the UE 101.

According to some embodiments of the present application, the resource selection controlling information may be transmitted by system information, a RRC signalling, a MAC CE, or a physical layer signalling. In an embodiment of the present application, the physical layer signalling may be DCI signalling.

According to some embodiments of the present application, the resource selection controlling information may be associated with a resource pool configuration. For example, the resource selection controlling information may be included in resource selection configuration information (e.g., resourceSelectionConfigP2X or resourceSelectionConfigV2X as defined in TS 36.331) for configuring the resource pool for the UE 101.

According to some embodiments of the present application, the resource selection controlling information may be associated with zone configuration. For example, the resource selection controlling information may be included in zone configuration information as specified in 3GPP standard document.

Figure 8:
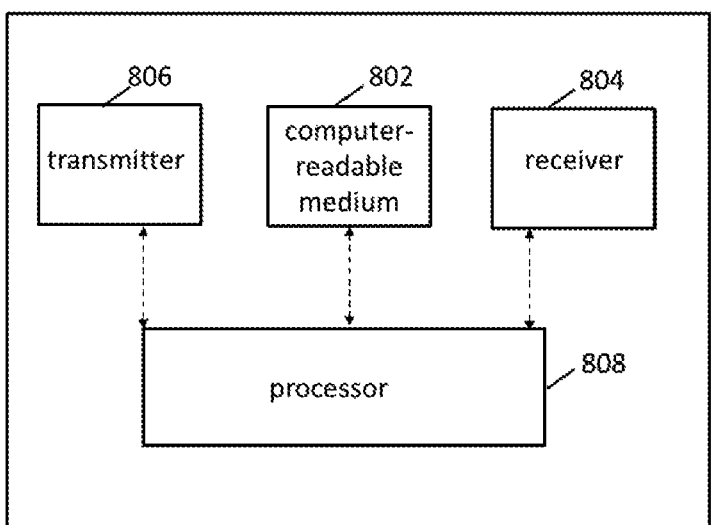
FIG. 8 illustrates a simplified block diagram of an apparatus 800 for reducing operations of monitoring PDCCH according to some other embodiments of the present application.

FIG. 8 illustrates a simplified block diagram of an apparatus 800 for reducing operations of monitoring PDCCH according to some other embodiments of the present application. The apparatus 800 may be a UE 101 as shown in FIG. 1.

Referring to FIG. 8, the apparatus 800 may include at least one non-transitory computer-readable medium 802, at least one receiver 804, at least one transmitter 806, and at least one processor 808. In some embodiment of the present application, at least one receiver 804 and at least one transmitter 806 and be integrated into at least one transceiver. The at least one non-transitory computer-readable medium 802 may have computer executable instructions stored therein. The at least one processor 808 may be coupled to the at least one non-transitory computer-readable medium 802, the at least one receiver 804 and the at least one transmitter 806. The computer executable instructions can be programmed to implement a method with the at least one receiver 804, the at least one transmitter 806 and the at least one processor 808 The method can be a method according to an embodiment of the present application, for example, the method shown in FIG. 5.

Figure 9:
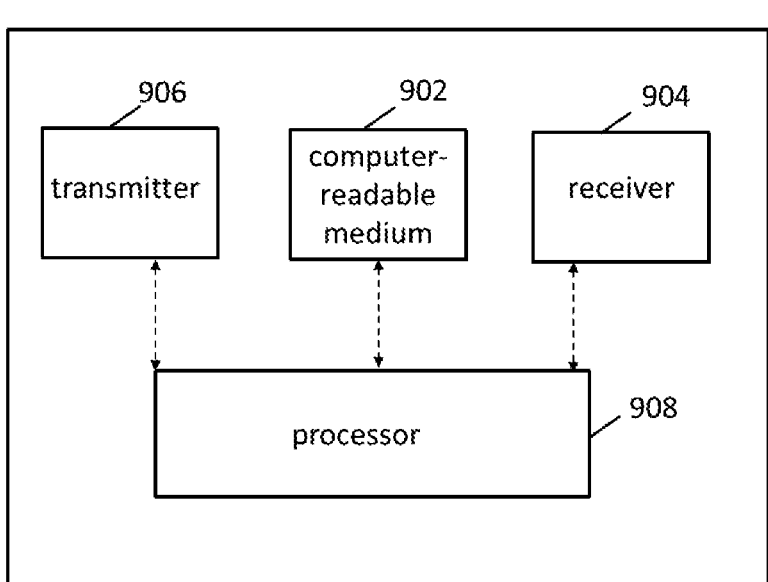
FIG. 9 illustrates a simplified block diagram of an apparatus 900 for reducing operations of monitoring PDCCH according to some other embodiments of the present application.

FIG. 9 illustrates a simplified block diagram of an apparatus 900 for reducing operations of monitoring PDCCH according to some embodiments of the present application. The apparatus 900 may be a BS 102 as shown in FIG. 1.

Referring to FIG. 9, the apparatus 900 may include at least one non-transitory computer-readable medium 902, at least one receiver 904, at least one transmitter 906, and at least one processor 908. In some embodiment of the present application, at least one receiver 904 and at least one transmitter 906 and be integrated into at least one transceiver. The at least one non-transitory computer-readable medium 902 may have computer executable instructions stored therein. The at least one processor 908 may be coupled to the at least one non-transitory computer-readable medium 902, the at least one receiver 904 and the at least one transmitter 906. The computer executable instructions can be programmed to implement a method with the at least one receiver 904, the at least one transmitter 906 and the at least one processor 908. The method can be a method according to an embodiment of the present application, for example, the method shown in FIG. 7.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method performed by a user equipment (UE), the method comprising:

receiving resource selection controlling information;

receiving an indication of a set of candidate resources for at least one of a physical sidelink control channel (PSCCH) transmission or a physical sidelink shared channel (PSSCH) transmission, a resource selection method, and a traffic priority of a second UE, wherein the indication is received when triggering a resource selection or a resource reselection at a time instance of a resource selection window of a resource pool, wherein the resource pool is overlapping with one or more resources for sidelink communication;

when the resource selection method of the second UE is a partial sensing based resource selection method, comparing the traffic priority of the second UE with a traffic priority of the UE;

when the traffic priority of the second UE is higher than the traffic priority of the UE, decreasing a selection opportunity for the set of candidate resources indicated in the indication; and determining one or more candidate resources from the set of candidate resources in the resource selection window of the resource pool for at least one of the PSCCH transmission or the PSSCH transmission based on the resource selection controlling information.

2. The method of claim 1, wherein the resource selection controlling information is included in resource selection configuration information for configuring the resource pool.

3. The method of claim 1, wherein the resource selection controlling information is included in zone configuration information.

4. The method of claim 1, wherein the resource selection controlling information is transmitted by system information, a radio resource control (RRC) signaling, a medium access control (MAC) control element (CE), or a physical layer signalling.

5. A user equipment (UE) for wireless communication, comprising:

at least one memory; and at least one processor coupled with the at least one memory and configured to cause the UE to:

receive resource selection controlling information;

receive an indication of a set of candidate resources for at least one of a physical sidelink control channel (PSCCH) transmission or a physical sidelink shared channel (PSSCH) transmission, a resource selection method, and a traffic priority of a second UE, wherein the indication is received when triggering a resource selection or a resource reselection at a time instance of a resource selection window of a resource pool, wherein the resource pool is overlapping with one or more resources for sidelink communication;

when the resource selection method of the second UE is a partial sensing based resource selection method, compare the traffic priority of the second UE with a traffic priority of the UE;

when the traffic priority of the second UE is higher than the traffic priority of the UE, decrease a selection opportunity for the set of candidate resources indicated in the indication; and determine one or more candidate resources from the set of candidate resources in the resource selection window of the resource pool for at least one of the PSCCH transmission or the PSSCH transmission based on the resource selection controlling information.

6. The UE of claim 5, wherein the resource selection controlling information indicates at least one resource selection probability, wherein each of the at least one resource selection probability is associated with at least one of: a traffic type, a traffic priority, a transmission type, a resource selection method, and a resource.

7. The UE of claim 6, wherein the traffic type is one of: a periodic traffic type, an aperiodic traffic type, a pedestrian to everything (P2X) traffic type, and a vehicle to everything (V2X) traffic type.

8. The UE of claim 6, wherein the traffic priority is one of: a ProSe Per-Packet Priority (PPPP) defined in long term evolution (LTE) sidelink and a priority defined in PC5 5G QoS Identifier (PQI).

9. The UE of claim 6, wherein the transmission type is one of an initial transmission type and a retransmission type.

10. The UE of claim 6, wherein the resource includes at least one of:

one or more single-subframe resources;

one or more subframes; and one or more sets of subframes.

11. The UE of claim 6, wherein the at least one processor is further configured to cause the UE to:

for each resource:

generate a random probability value between 0 and 1;

in a case that the random probability value is larger than or equal to a value of a resource selection probability associated with the resource, include the resource in the one or more candidate resources; and in a case that the random probability value is less than the value of the resource selection probability, exclude the resource from the one or more candidate resources.

12. The UE of claim 5, wherein the resource selection controlling information indicates a resource selection sequence for a group of resources, wherein the resource selection sequence is associated with at least one of: a traffic type, a traffic priority, a transmission type, or a resource selection method.

13. The UE of claim 12, wherein the resource selection sequence comprises an ordered sequence of indices, wherein each index corresponds to a resource of the group of resources.

14. The UE of claim 12, wherein the at least one processor is further configured to cause the UE to:

order the one or more candidate resources according to the resource selection sequence; and select resource for at least one of the PSCCH transmission or the PSSCH transmission according to the ordered one or more candidate resources.

15. The UE of claim 5, wherein the indication indicates the traffic priority of the UE.

16. The UE of claim 5, wherein the at least one processor is further configured to cause the UE to:

use the resource selection controlling information associated with the set of candidate resources to determine the one or more candidate resources.

17. A base station for wireless communication, comprising:

at least one memory; and at least one processor coupled with the at least one memory and configured to cause the base station to:

generate resource selection controlling information for a user equipment (UE), wherein the resource selection controlling information is used for the UE to determine one or more candidate resources in a resource selection window of a resource pool for at least one of a physical sidelink control channel (PSCCH) transmission or a physical sidelink shared channel (PSSCH) transmission, and wherein the resource pool is overlapping with one or more resources for sidelink communication; and transmit the resource selection controlling information to the UE, wherein, when a resource selection method of a second UE is a partial sensing based resource selection method, a traffic priority of the second UE with a traffic priority of the UE, and when the resource selection method of the second UE is the partial sensing based resource selection method and the traffic priority of the second UE is higher than the traffic priority of the UE, a selection opportunity for the one or more candidate resources by the UE is decreased.

18. The base station of claim 17, wherein the resource selection controlling information is included in resource selection configuration information for configuring the resource pool.

19. The base station of claim 17, wherein the resource selection controlling information is included in zone configuration information.

20. A method performed by a base station, the method comprising:

generating resource selection controlling information for a user equipment (UE), wherein the resource selection controlling information is used for the UE to determine one or more candidate resources in a resource selection window of a resource pool for at least one of a physical sidelink control channel (PSCCH) transmission or a physical sidelink shared channel (PSSCH) transmission, and wherein the resource pool is overlapping with one or more resources for sidelink communication; and transmitting the resource selection controlling information to the UE, wherein, when the resource selection method of a second UE is a partial sensing based resource selection method, a traffic priority of the second UE with a traffic priority of the UE, and when a resource selection method of the second UE is the partial sensing based resource selection method and the traffic priority of the second UE is higher than the traffic priority of the UE, a selection opportunity for the one or more candidate resources by the UE is decreased.

* * * * *